United States Patent
Yang et al.

(10) Patent No.: US 12,126,417 B2
(45) Date of Patent: Oct. 22, 2024

(54) MULTI-ANTENNA COHERENCE CAPABILITY REPORTING METHOD, TERMINAL, BASE STATION AND STORAGE MEDIUM

(71) Applicant: CHINA TELECOM CORPORATION LIMITED, Beijing (CN)

(72) Inventors: Shan Yang, Beijing (CN); Bo Liu, Beijing (CN); Jianchi Zhu, Beijing (CN); Xiaoming She, Beijing (CN); Peng Chen, Beijing (CN)

(73) Assignee: CHINA TELECOM CORPORATION LIMITED, Beijing (CN)

( * ) Notice: Subject to any disclaimer, the term of this patent is extended or adjusted under 35 U.S.C. 154(b) by 0 days.

(21) Appl. No.: 18/553,109

(22) PCT Filed: Sep. 13, 2021

(86) PCT No.: PCT/CN2021/117951
§ 371 (c)(1),
(2) Date: Sep. 28, 2023

(87) PCT Pub. No.: WO2022/205785
PCT Pub. Date: Oct. 6, 2022

(65) Prior Publication Data
US 2024/0187072 A1    Jun. 6, 2024

(30) Foreign Application Priority Data

Mar. 31, 2021    (CN) .......................... 202110348897.7

(51) Int. Cl.
*H04B 7/06* (2006.01)
*H04W 8/24* (2009.01)

(52) U.S. Cl.
CPC ............ *H04B 7/0628* (2013.01); *H04W 8/24* (2013.01)

(58) Field of Classification Search
CPC .............................. H04B 7/0628; H04W 8/24
See application file for complete search history.

(56) References Cited

U.S. PATENT DOCUMENTS

| 2005/0243748 A1 | 11/2005 | Bosch et al. |
| 2020/0351047 A1 | 11/2020 | Akkarakaran et al. |
| (Continued) | | |

FOREIGN PATENT DOCUMENTS

| CN | 109495879 A | 3/2019 |
| CN | 109690962 A | 4/2019 |
| (Continued) | | |

OTHER PUBLICATIONS

Notice of Grant issued on Jun. 1, 2023 in corresponding Chinese Application No. 2021103488973.7; 3 pages.

(Continued)

*Primary Examiner* — Nader Bolourchi
(74) *Attorney, Agent, or Firm* — Andrew M. Calderon; Calderon Safran & Wright P.C.

(57) ABSTRACT

The present disclosure provides a multi-antenna transmission coherence capability reporting method, a terminal, a base station and a storage medium, wherein the method includes: after the terminal establishes a connection with the base station, sending, by the terminal, multi-antenna coherence capability information to the base station, wherein the multi-antenna coherence capability information is used for indicating whether the terminal, in an uplink Tx switching mode, is capable of supporting coherence between multiple transmitting antennas for a carrier with two uplink transmission antennas when dynamic switching between two bands is performed.

16 Claims, 4 Drawing Sheets

(56) References Cited

U.S. PATENT DOCUMENTS

2020/0412421 A1    12/2020   Jiang et al.
2023/0354358 A1*   11/2023   Bhamri .............. H04W 72/231

FOREIGN PATENT DOCUMENTS

| CN | 109802711 A | 5/2019 |
|----|-------------|--------|
| CN | 110572913 A | 12/2019 |
| CN | 110838857 A | 2/2020 |
| CN | 110971317 A | 4/2020 |
| CN | 110972245 A | 4/2020 |

OTHER PUBLICATIONS

International Search Report and Written Opinion issued on Dec. 30, 2021 in corresponding Application No. PCT/CN2021/117951; 10 pages.

Office Action issued on Feb. 25, 2023 in corresponding Chinese Application No. 2021103488973.7; 24 pages.

Japanese Office Action dated Apr. 4, 2024 in Japanese Application No. 2023-560608 with English Translation, 7 pages.

Unknown, "Discussion on SRS Enhancements", 3GPP TSG RAN WG1 #103-e, e-Meeting, Jan. 25-Feb. 5, 2021, 8 pages.

Unknown, "Discussion on the remaining problems of supporting Tx switching between two uplink", 3GPP TSG RAN WG1 Meeting #104-e, E-meeting, Jan. 25-Feb. 5, 2021, 4 pages.

* cited by examiner

MULTI-ANTENNA COHERENCE CAPABILITY REPORTING METHOD, TERMINAL, BASE STATION AND STORAGE MEDIUM

CROSS-REFERENCE TO RELATED APPLICATIONS

The present disclosure is based on and claims the priority to the Chinese Patent Application No. 202110348897.7 filed on Mar. 31, 2021, the disclosure of which is incorporated by reference herein in its entirety.

TECHNICAL FIELD

The present disclosure relates to the technical field of communication, and in particular, to a multi-antenna transmission coherence capability reporting method, a terminal, a base station, and a storage medium.

BACKGROUND

An uplink transmitter (Tx, also known as Tx chain or transmit antenna connector, etc.) switching technique has been introduced in the 5G standard. For example, a terminal is configured with an uplink Tx switching mode, and uses a frequency division duplexing (FDD) carrier and/or a time division duplexing (TDD) carrier in an uplink by means of Tx switching to maximize utilization of uplink resources, which can achieve improvement on network capacity and coverage performance and lower radio latency, so that requirements of higher uplink rate and lower latency are met.

SUMMARY

According to a first aspect of the present disclosure, after a terminal establishes a connection with a base station, sending, by the terminal, multi-antenna coherence capability information to the base station, wherein the multi-antenna coherence capability information is used for indicating whether the terminal, in an uplink Tx switching mode, is capable of maintaining coherence between multiple transmission antennas for a carrier with two uplink transmission antennas when dynamical switching between two frequency bands is performed.

In some embodiments, after sending the multi-antenna coherence capability information, the terminal receives uplink scheduling information sent by the base station, to perform corresponding configuration based on the uplink scheduling information.

In some embodiments, the multi-antenna coherence capability information comprises: at least one of non-coherent transmission capability information, partial-coherent transmission capability information, or full-coherent transmission capability information, wherein a granularity of the non-coherent transmission capability information, the partial-coherent transmission capability information, and the full-coherent transmission capability information is at least one granularity of a band combination, a band, or a terminal.

In some embodiments, a reporting granularity of the non-coherent transmission capability information, the partial-coherent transmission capability information, and the full-coherent transmission capability information is at least one granularity of each band combination supporting uplink Tx switching, each band capable of two uplink transmission antennas supporting the uplink Tx switching, each band with two uplink transmission antennas within a band combination supporting the uplink Tx switching, or a terminal supporting the uplink Tx switching.

In some embodiments, the sending, by the terminal, multi-antenna coherence capability information to the base station comprises: generating, by the terminal, a pusch-TransCoherence indication based on the multi-antenna coherence capability information, adding the pusch-TransCoherence indication into MIMO-ParametersPerBand capability information, and sending the MIMO-ParametersPerBand capability information to the base station.

In some embodiments, the sending, by the terminal, multi-antenna coherence capability information to the base station comprises: by the terminal, adding the multi-antenna coherence capability information in the uplink Tx switching mode into a coherence indication message, and sending the coherence indication message to the base station.

In some embodiments, if not receiving the coherence indication message, the base station extracts the pusch-TransCoherence indication in the received MIMO-ParametersPerBand capability information to obtain multi-antenna coherence information.

In some embodiments, the connection established by the terminal with the base station comprises a radio resource control (RRC) connection; and the sending, by the terminal, the coherence indication message to the base station comprises: after establishing the RRC connection with the base station, sending, by the terminal, the coherence indication message to the base station through an physical uplink sharing channel time slot allocated by the base station.

In some embodiments, the terminal receives RRC signaling sent by the base station, and configures the uplink Tx switching mode, wherein the RRC signaling comprises: uplink Tx switching configuration signaling.

In some embodiments, the frequency band comprises: a TDD band and an FDD band; and the carrier with two uplink transmission antennas comprises: at least one of an uplink FDD carrier or an uplink TDD carrier.

According to a second aspect of the present disclosure, there is provided a multi-antenna transmission coherence capability reporting method, comprising: after a connection between a base station and a terminal is established, receiving, by the base station, multi-antenna coherence capability information sent by the terminal, wherein the multi-antenna coherence capability information is used for indicating whether the terminal, in an uplink Tx switching mode, is capable of maintaining coherence between multiple transmission antennas for a carrier with two uplink transmission antennas when dynamic switching between two frequency bands is performed.

In some embodiments, after receiving the multi-antenna coherence capability information, the base station sends uplink scheduling information to the terminal, so that the terminal performs corresponding configuration based on the uplink scheduling information.

In some embodiments, the multi-antenna coherence capability information comprises: at least one of non-coherent transmission capability information, partial-coherent transmission capability information, or full-coherent transmission capability information, wherein granularities of the non-coherent transmission capability information, the partial-coherent transmission capability information, and the full-coherent transmission capability information are at least one granularity of a band combination, a band, or a terminal.

In some embodiments, the receiving, by the base station, multi-antenna coherence capability information sent by the terminal comprises: receiving, by the base station, MIMO- ParametersPerBand capability information sent by the terminal, extracting a pusch-TransCoherence indication in the MIMO-ParametersPerBand capability information, and determining the multi-antenna coherence capability information based on the pusch-TransCoherence indication.

In some embodiments, the receiving, by the base station, multi-antenna coherence capability information sent by the terminal comprises: receiving, by the base station, a coherence indication message sent by the terminal, and extracting the multi-antenna coherence capability information from the coherence indication message.

In some embodiments, the base station sends RRC signaling to the terminal, so that the terminal, after receiving the RRC signaling, configures the uplink Tx switching mode, wherein the RRC signaling comprises uplink Tx switching configuration signaling.

In some embodiments, if not receiving the coherence indication message, the base station extracts the pusch-TransCoherence indication in the received MIMO-ParametersPerBand capability information to obtain multi-antenna coherence information.

According to a third aspect of the present disclosure, there is provided a terminal, comprising: a capability information reporting module configured to, after the terminal establishes a connection with a base station, send multi-antenna coherence capability information to the base station, wherein the multi-antenna coherence capability information is used for indicating whether the terminal, in an uplink Tx switching mode, is capable of maintaining coherence between multiple transmission antennas for a carrier with two uplink transmission antennas when dynamic switching between two frequency bands is performed.

In some embodiments, a scheduling information processing module is configured to, after the multi-antenna coherence capability information is sent, receive uplink scheduling information sent by the base station, to perform corresponding configuration based on the uplink scheduling information.

In some embodiments, the capability information reporting module comprises: a first reporting unit configured to generate a pusch-TransCoherence indication based on the multi-antenna coherence capability information, add the pusch-TransCoherence indication into MIMO-ParametersPerBand capability information, and send the MIMO-ParametersPerBand capability information to the base station.

In some embodiments, the capability information reporting module comprises: a second reporting unit configured to add the multi-antenna coherence capability information in the uplink Tx switching mode into a coherence indication message, and send the coherence indication message to the base station.

In some embodiments, the second reporting unit is configured to, after an RRC connection is established with the base station, send the coherence indication message to the base station through an physical uplink sharing channel time slot allocated by the base station.

In some embodiments, a first switching mode configuring module is configured to receive RRC signaling sent by the base station and configure the uplink Tx switching mode, wherein the RRC signaling comprises: uplink Tx switching configuration signaling.

According to a fourth aspect of the present disclosure, there is provided a terminal, comprising: a memory; and a processor coupled to the memory, the processor being configured to perform, based on instructions stored in the memory, the method as described above.

According to a fifth aspect of the present disclosure, there is provided a base station, comprising: a capability information receiving module configured to, after a connection between the base station and a terminal is established, receive multi-antenna coherence capability information sent by the terminal, wherein the multi-antenna coherence capability information is used for indicating whether the terminal, in an uplink Tx switching mode, is capable of maintaining coherence between multiple transmission antennas for a carrier with two uplink transmission antennas when dynamic switching between two frequency bands is performed.

In some embodiments, a scheduling information sending module is configured to, after the multi-antenna coherence capability information is received, send uplink scheduling information to the terminal, so that the terminal performs corresponding configuration based on the uplink scheduling information.

In some embodiments, the capability information receiving module comprises: a first information receiving module configured to receive MIMO-ParametersPerBand capability information sent by the terminal, extract a pusch-TransCoherence indication in the MIMO-ParametersPerBand capability information, and determine the multi-antenna coherence capability information based on the pusch-TransCoherence indication.

In some embodiments, the capability information receiving module comprises: a second information receiving module configured to receive a coherence indication message sent by the terminal, and extract the multi-antenna coherence capability information from the coherence indication message.

In some embodiments, a second switching mode configuring module is configured to send RRC signaling to the terminal, so that the terminal, after receiving the RRC signaling, configures the uplink Tx switching mode, wherein the RRC signaling comprises: uplink Tx switching configuration signaling.

In some embodiments, the capability information receiving module is configured to, if the coherence indication message is not received, extract the pusch-TransCoherence indication in the received MIMO-ParametersPerBand capability information to obtain multi-antenna coherence information.

According to a sixth aspect of the present disclosure, there is provided a base station, comprising: a memory; and a processor coupled to the memory, the processor being configured to perform, based on instructions stored in the memory, the method as described above.

According to a seventh aspect of the present disclosure, there is provided a computer-readable storage medium having thereon stored computer instructions which, when executed by a processor, perform the method as described above.

BRIEF DESCRIPTION OF THE DRAWINGS

In order to more clearly illustrate the embodiments of the present disclosure or technical solutions in the related art, the drawings required to be used in the description of the embodiments or the related art will be briefly described below, it is obvious that the drawings in the description below are only some embodiments of the present disclosure, and for one of ordinary skill in the art, other drawings may be obtained according to the drawings without paying out creative efforts.

DETAILED DESCRIPTION

Figure 1:
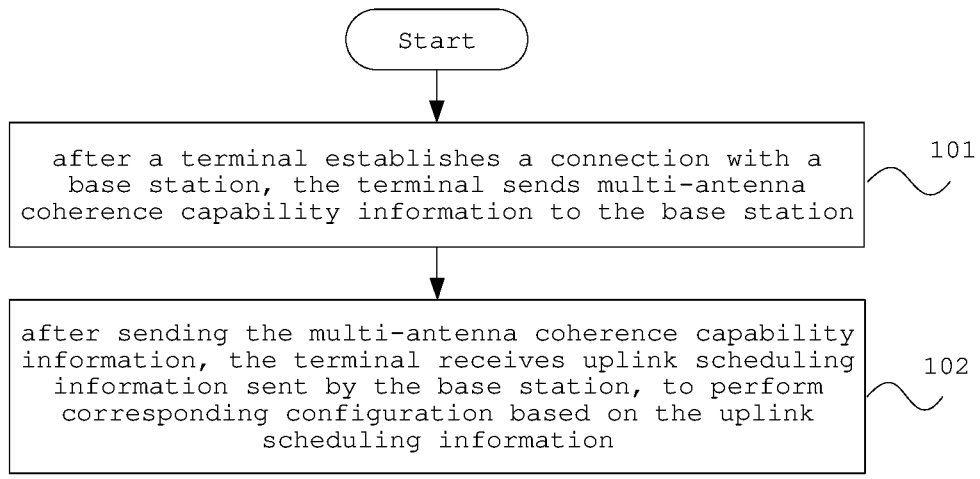
FIG. 1 is a schematic flow diagram of a multi-antenna transmission coherence capability reporting method according to some embodiments of the present disclosure.

The more full description of the present disclosure will be made below with reference to the accompanying drawings, in which exemplary embodiments of the present disclosure are described. The technical solutions in the embodiments of the present disclosure will be described below clearly and completely in conjunction with the drawings in the embodiments of the present disclosure, and it is obvious that the embodiments described are only some embodiments of the present disclosure, rather than all embodiments. All other embodiments, which are obtained by one of ordinary skill in the art based on the embodiments in the present disclosure without making creative efforts, shall fall within the scope of protection of the present disclosure. Various aspects of the technical solutions of the present disclosure will be described below in conjunction with various drawings and embodiments.

The terms "first", "second", etc. hereinafter are only used for descriptive distinction and have no other special meanings.

In the related art known to the inventors, when terminals are in an uplink Tx switching mode and a terminal performs dynamic Tx switching between frequency bands, some terminals cannot maintain multi-antenna coherence, which may affect uplink transmission performances.

In the 3GPP R16 standard, an uplink Tx switching mode is applicable to switching between two carriers, and one carrier is capable of single uplink transmission antenna, and the other carrier is capable of two uplink transmission antennas. In a later stage of the 5G R16, the 3GPP introduces a function of two uplink transmission antennas for an FDD carrier at a carrier frequency around 2 GHz. The 3GPP R16/R17 introduces uplink Tx switching modes for different scenarios, so that in the different uplink Tx switching modes, at least one carrier may have a transmission capability of two uplink transmission antennas. After transmitters (Txs) of some terminals perform dynamic switching between frequency bands, multi-antenna coherence cannot be maintained, which affects uplink transmission performances.

In view of this, a technical problem to be solved by the present disclosure is to provide a multi-antenna transmission coherence capability reporting method, a terminal, a base station, and a storage medium, in which after the terminal establishes a connection with the base station, multi-antenna coherence capability information is sent to the base station; the multi-antenna coherence capability information being used for indicating whether the terminal, in an uplink Tx switching mode, is capable of maintaining coherence between multiple transmission antennas for a carrier with two uplink transmission antennas when dynamic switching between two frequency bands is performed; and which are applicable to various uplink Tx switching application scenarios, where requirements of higher uplink rate and/or lower latency are met, so that it is possible to ensure performance and stability of uplink transmission and improve use experience of a user.

FIG. 1 is a schematic flow diagram of a multi-antenna transmission coherence capability reporting method according to some embodiments of the present disclosure, as shown in FIG. 1:

step 101, after a terminal establishes a connection with a base station, the terminal sends multi-antenna coherence capability information to the base station.

In some embodiments, for a 5G new radio (NR) dual-band networking scenario, at least in one band used by the terminal, the terminal has a transmission capability of two uplink transmission antennas. The frequency band comprises a TDD band, an FDD band, and the like; the carrier with two uplink transmission antennas comprises at least one of an uplink FDD carrier or an uplink TDD carrier; and each band may correspond to one, two, three or more carriers with two uplink transmission antennas. The terminal comprises a mobile phone, a tablet computer, and the like.

For example, when a terminal is in an uplink Tx switching mode, and one or two sets of the transmitters of the terminal perform dynamic switching between two carriers, a carrier with two uplink transmission antennas may be an uplink FDD carrier or an uplink TDD carrier, that is, a carrier for which the terminal has two uplink transmission antennas is a carrier with two uplink transmission antennas, which is a carrier usable for performing uplink data transmission.

The multi-antenna coherence capability information is used for indicating whether the terminal, in an uplink Tx switching mode, is capable of maintaining coherence between multiple transmission antennas for the carrier with two uplink transmission antennas when dynamic switching is performed between two frequency bands. By reporting the multi-antenna coherence capability information, it is distinguished whether the terminal is, in the uplink Tx switching mode, capable of maintaining the multi-antenna coherence for the carrier with two uplink transmission antennas when there are one or two sets of transmitters performing dynamic switching between the two frequency bands.

The dynamic switching refers to fast switching of the transmitter between two frequency bands on the order of hundred-us (e.g., 35 us, 140 us, 210 us) based on base station scheduling and an uplink switching mechanism defined in the 3GPP TS 38.214. The coherence between multiple transmission antennas is coherence between uplink multiple transmission antennas, which refers to maintaining phase continuity and power consistency under a certain tolerance within a period of time, and which has been defined in the 3GPP TS 38 series.

Step 102, after sending the multi-antenna coherence capability information, the terminal receives uplink scheduling information sent by the base station, to perform corresponding configuration based on the uplink scheduling information.

In some embodiments, the base station receives reporting information of the terminal such as the multi-antenna coherence capability information, and sends the uplink scheduling information to the terminal, wherein the uplink scheduling information comprises reference power, reference phase, or the like corresponding to a precoding matrix in a codebook subset of PUSCH, and the terminal performs corresponding configuration based on the uplink scheduling information. Based on the multi-antenna coherence capability information, the base station can schedule coherent UL MIMO for a terminal capable of maintaining coherence between two uplink transmission antennas.

In the multi-antenna transmission coherence capability reporting method in the foregoing embodiment, by reporting the multi-antenna coherence capability information, when there are one or two sets of transmitters performing dynamic switching between two frequency bands, it is determined whether the terminal is capable of maintaining the coherence between multiple transmission antennas for the carrier with two uplink transmission antennas, so that the method is applicable to various modes such as a dynamic Tx switching mode.

In some embodiments, the multi-antenna coherence capability information comprises at least one of non-coherent transmission capability information, partial-coherent transmission capability information, or full-coherent transmission capability information; and granularities of the non-coherent transmission capability information, the partial-coherent transmission capability information, and the full-coherent transmission capability information are at least one granularity of a band combination, a band, or a terminal, that is, the multi-antenna coherence capability may be reported based on each band combination, each band, or each terminal.

The coherent transmission capability refers to a capability of maintaining a relative phase difference and power difference between the antennas of the terminal to be within a certain range. The multi-antenna coherence capability information comprises an coherent transmission capability of multi-antennas, and there are three types of coherent transmission capabilities: full-coherent transmission capability, that is, coherent transmission can be performed between all antennas; partial-coherent transmission capability, that is, coherent transmission between antennas within a coherent transmission group can be performed, coherent transmission cannot be performed between coherent transmission groups, each coherent transmission group may comprise two antennas, and the like; and non-coherent transmission capability, that is, coherent transmission between antennas cannot be performed.

For example, a reporting granularity of the non-coherent transmission capability information, the partial-coherent transmission capability information, and the full-coherent transmission capability information is at least one granularity of each band combination supporting uplink Tx switching, each band capable of two uplink transmission antennas supporting the uplink Tx switching, each band with two uplink transmission antennas within a band combination supporting the uplink Tx switching, or a terminal supporting the uplink Tx switching.

Based on different switching scenarios, the multi-antenna coherence capability information may report all (one or more) carriers with a transmission capability of two transmission antennas. If the granularity is for each band combination supporting the Tx switching, signaling for reporting the multi-antenna coherence capability information is defined in band Combination list for the Tx switching in R16 and the later releases.

In some embodiments, the terminal may, for the reporting of the multi-antenna coherence capability information, reuse a pusch-TransCoherence capability in the 3GPP R15, or use a new coherence indication message. If reusing the pusch-TransCoherence capability in the 3GPP R15, the terminal (which is in the uplink Tx switching state after the base station RRC configuration) generates a pusch-TransCoherence indication based on the multi-antenna coherence capability information, adds the pusch-TransCoherence indication into MIMO-ParametersPerBand capability information, and sends the MIMO-ParametersPerBand capability information to the base station.

In the 3GPP R15, the limitation on codebook subset supported by the terminal is indicated by the pusch-TransCoherence in the MIMO-ParametersPerBand: when the pusch-TransCoherence reported by the terminal is non-Coherent, the terminal is a terminal with the non-coherent transmission capability; when the pusch-TransCoherence reported by the terminal is partialNonCoherent, the terminal is a terminal with the partial-coherent transmission capability; and when the pusch-TransCoherence reported by the terminal is fullCoherent, the terminal is a terminal with the full-coherent transmission capability.

When reusing the pusch-TransCoherence indication, if the terminal is capable of maintaining or partially maintaining the coherence between the multiple transmission antennas, a value of the pusch-TransCoherence is set to be the full-coherent transmission capability information or the partial-coherent transmission capability information based on the at least one granularity of a band combination, a band, or a terminal; and if the terminal is incapable of maintaining the coherence between the multiple transmission antennas, the value of the pusch-TransCoherence may be set to be nonCoherent, or may be set to be the non-coherent transmission capability information based on the at least one granularity of a band combination, a band, and a terminal.

In some embodiments, the terminal may send the multi-antenna coherence capability information to the base station through a newly defined coherence indication message, which may be in a variety of message formats. The multi-antenna coherence capability information is information for each band combination supporting the Tx switching, or for each band capable of two transmission antenna (two uplink transmission antennas), or for each band capable of two transmission antenna within each band combination supporting the Tx switching, or for each terminal supporting the Tx switching (i.e., the terminal supporting the Tx switching within one or more band combinations).

If not receiving the multi-antenna coherence capability information, the base station determines that the capability that the terminal is capable of maintaining the uplink multi-antenna coherence is consistent with a capability that is reported by the terminal through the Rel-15 pusch-TransCoherence, namely, the base station extracts the pusch-TransCoherence indication in the received MIMO-ParametersPerBand capability information to obtain multi-antenna coherence information.

In some embodiments, the reporting of the multi-antenna coherence capability information is an option, and for a band combination/band/terminal that do not report the multi-antenna coherence capability information, the base station confirms that the capability that the terminal is capable of maintaining the uplink multi-antenna coherence is consistent with the capability that is reported through the pusch-TransCoherence.

The terminal adds the multi-antenna coherence capability information in the uplink Tx switching mode into the coherence indication message, and sends the coherence indication message to the base station. The connection established by the terminal with the base station may be various connections, for example, an RRC connection, and after the RRC connection is established with the base station, the terminal sends the coherence indication message to the base station through a physical uplink sharing channel time slot allocated by the base station.

In some embodiments, the terminal receives RRC signaling sent by the base station, and configures the uplink Tx switching mode, wherein the RRC signaling comprises uplink Tx switching configuration signaling, and the like. For example, the terminal in the uplink Tx switching mode may be configured and implemented by the base station sending the RRC signaling (e.g., UplinkTxSwitching in the R16, Tx switching RRC switching signaling in the R17, etc.).

By the multi-antenna transmission coherence capability reporting method, it is distinguished whether the multi-antenna coherence can be maintained after the transmitter of the terminal performs dynamic switching between the frequency bands; for all the carriers capable of two uplink transmission antennas, implementations of different terminals can be distinguished by introducing the reporting of the multi-antenna coherence capability information of the terminal; and by setting the multi-antenna coherence capability information to be optionally reported, if a terminal does not additionally report the multi-antenna coherence capability information in the Tx switching mode, the base station considers that the terminal is capable of maintaining the same uplink antenna coherence as in the non-Tx switching mode, so that impact on a terminal developed based on the existing specification can be reduced.

Figure 2:
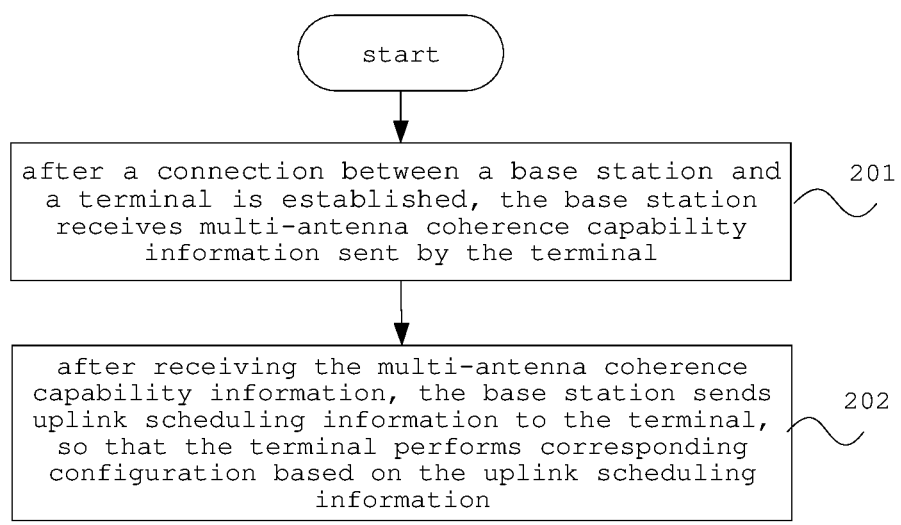
FIG. 2 is a schematic flow diagram of a multi-antenna transmission coherence capability reporting method according to other embodiments of the present disclosure.

FIG. 2 is a flow diagram of a multi-antenna transmission coherence capability reporting method according to other embodiments of the present disclosure, as shown in FIG. 2:

step 201, after a connection between a base station and a terminal is established, the base station receives multi-antenna coherence capability information sent by the terminal.

The multi-antenna coherence capability information is used for indicating whether the terminal, in an uplink Tx switching mode, is capable of maintaining coherence between multiple transmission antennas for a carrier with two uplink transmission antennas when dynamic switching between two frequency bands is performed.

Step 202, after receiving the multi-antenna coherence capability information, the base station sends uplink scheduling information to the terminal, so that the terminal performs corresponding configuration based on the uplink scheduling information.

The base station distinguishes whether the terminal is capable of maintaining transmission antenna coherence for the carrier with two uplink transmission antennas based on the multi-antenna coherence capability information sent by the terminal. The coherence between uplink multiple transmission antennas refers to phase continuity and power consistency under a certain tolerance maintained within a period of time. For a terminal capable of maintaining coherence between two uplink transmission antennas, the base station may schedule coherent UL MIMO.

If not receiving the multi-antenna coherence capability information additionally reported in the uplink Tx switching mode, the base station extracts a pusch-TransCoherence indication in received MIMO-ParameterPerBand capability information to obtain the multi-antenna coherence information.

In some embodiments, the base station receives the MIMO-ParametersPerBand capability information sent by the terminal, extracts the pusch-TransCoherence indication in the MIMO-ParametersPerBand capability information, to determine the multi-antenna coherence capability information based on the pusch-TransCoherence indication.

The receiving, by the base station, multi-antenna coherence capability information sent by the terminal comprises: receiving, by the base station, a coherence indication message sent by the terminal, and extracting the multi-antenna coherence capability information from the coherence indication message. The base station sends RRC signaling to the terminal, so that the terminal configures the uplink Tx switching mode after receiving the RRC signaling, wherein the RRC signaling comprises uplink Tx switching configuration signaling and the like.

Figure 3:
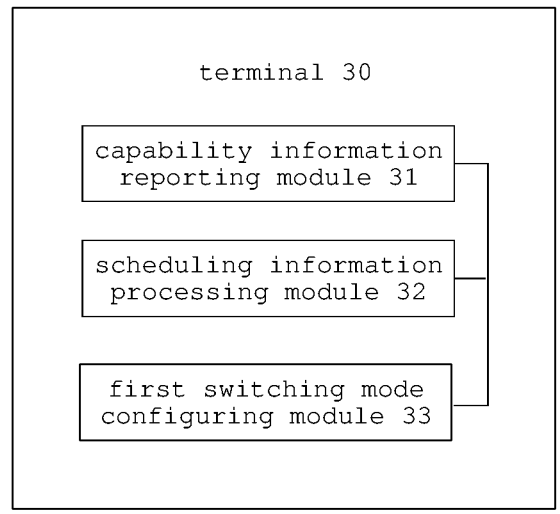
FIG. 3 is a schematic module diagram of a terminal according to some embodiments of the present disclosure.

In some embodiments, as shown in FIG. 3, the present disclosure provides a terminal 30, comprising: a capability information reporting module 31, a scheduling information processing module 32, and a first switching mode configuring module 33. The capability information reporting module 31 sends, after the terminal establishes a connection with a base station, multi-antenna coherence capability information to the base station, wherein the multi-antenna coherence capability information is used for indicating whether the terminal, in an uplink Tx switching mode, is capable of maintaining coherence between multiple transmission antennas for a carrier with two uplink transmission antennas when dynamic switching between two frequency bands is performed.

After the multi-antenna coherence capability information is sent, the scheduling information processing module 32 receives uplink scheduling information sent by the base station, to perform corresponding configuration based on the uplink scheduling information. The switching mode configuring module 33 receives RRC signaling sent by the base station, and configures the uplink Tx switching mode, wherein the RRC signaling comprises uplink Tx switching configuration signaling and the like.

Figure 4:
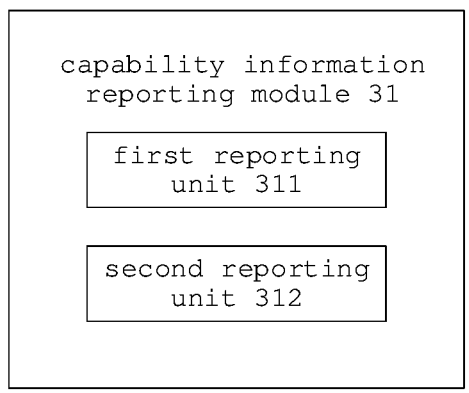
FIG. 4 is a schematic module diagram of a capability information reporting module in a terminal according to some embodiments of the present disclosure.

As shown in FIG. 4, the capability information reporting module 31 comprises a first reporting unit 311 and a second reporting unit 312. The first reporting unit 311 generates a pusch-TransCoherence indication based on the multi-antenna coherence capability information, adds the pusch-TransCoherence indication into MIMO-ParametersPerBand capability information, and transmits the MIMO-ParametersPerBand capability information to the base station.

The second reporting unit 312 adds the multi-antenna coherence capability information in the uplink Tx switching mode into a coherence indication message, and sends the coherence indication message to the base station. For example, the second reporting unit 312 sends the coherence indication message to the base station through an physical uplink sharing channel time slot allocated by the base station after an RRC connection is established with the base station.

Figure 5:
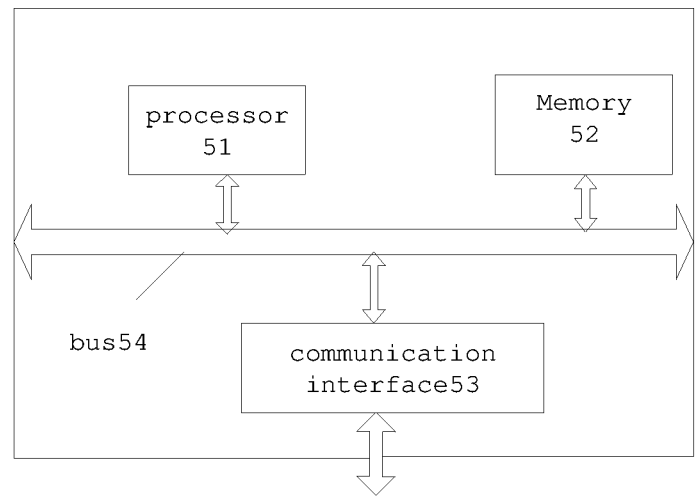
FIG. 5 is a schematic module diagram of a terminal according to other embodiments of the present disclosure.

In some embodiments, as shown in FIG. 5, the present disclosure provides a terminal 50, comprising a memory 51, a processor 52, a communication interface 53, and a bus 54. The memory 51 is used for storing instructions, the processor 52 is coupled to the memory 51, and the processor 52 is configured to implement, based on the instructions stored in the memory 51, the above multi-antenna transmission coherence capability reporting method.

The memory 51 may be a high-speed RAM memory, a non-volatile memory, or the like, and the memory 51 may also be a memory array. The memory 51 may also be partitioned into blocks, and the blocks may be combined into virtual volumes according to certain rules. The processor 52 may be a central processing unit (CPU), or an application specific integrated circuit (ASIC), or one or more integrated circuits configured to implement the multi-antenna transmission coherence capability reporting method of the present disclosure.

Figure 6:
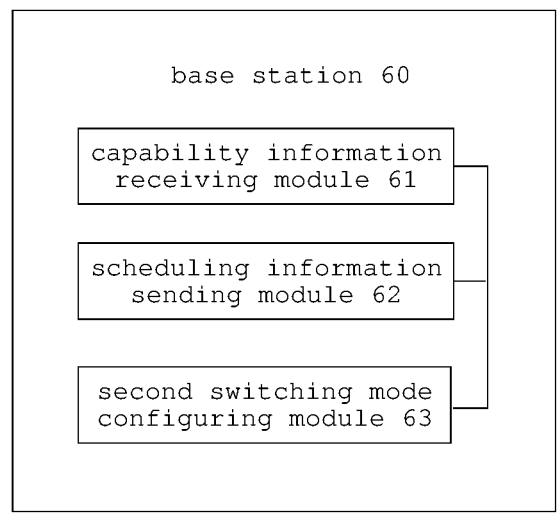
FIG. 6 is a schematic module diagram of a base station according to some embodiments of the present disclosure.

In some embodiments, as shown in FIG. 6, the present disclosure provides a base station 60, comprising: a capability information receiving module 61, a scheduling information sending module 62, and a second switching mode configuring module 63. After a connection between the base station and a terminal is established, the capability information receiving module 61 receives multi-antenna coherence capability information sent by the terminal, wherein the multi-antenna coherence capability information is used for indicating whether the terminal, in an uplink Tx switching mode, is capable of maintaining coherence between multiple transmission antennas for a carrier with two uplink transmission antennas when dynamic switching between two frequency bands is performed.

After the multi-antenna coherence capability information is received, the scheduling information sending module 62 sends uplink scheduling information to the terminal, so that the terminal performs corresponding configuration based on the uplink scheduling information. If not receiving the coherence indication message, the capability information receiving module 62 extracts a pushch-TransCoherence indication in received MIMO-ParametersPerBand capability information, to obtain multi-antenna coherence information.

The second switching mode configuring module 63 sends RRC signaling to the terminal, so that the terminal configures the uplink Tx switching mode after receiving the RRC signaling, wherein the RRC signaling comprises: uplink Tx switching configuration signaling and the like.

Figure 7:
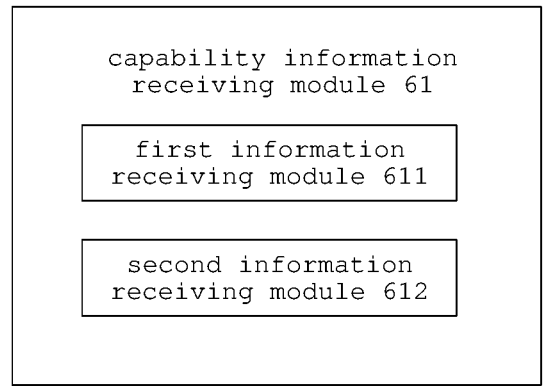
FIG. 7 is a schematic module diagram of a capability information receiving module in a base station according to some embodiments of the present disclosure.

In some embodiments, as shown in FIG. 7, the capability information receiving module 61 comprises: a first information receiving module 611 and a second information receiving module 612. The first information receiving module 611 receives the MIMO-ParametersPerBand capability information sent by the terminal, extracts the pusch-TransCoherence indication in the MIMO-ParametersPerBand capability information, and determines the multi-antenna coherence capability information based on the pusch-TransCoherence indication. The second information receiving module 612 receives a coherence indication message sent by the terminal, and extracts the multi-antenna coherence capability information from the coherence indication message.

Figure 8:
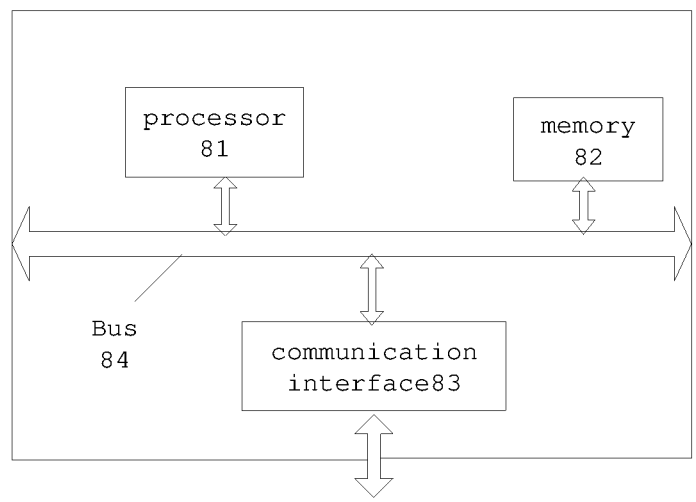
FIG. 8 is a schematic module diagram of a base station according to other embodiments of the present disclosure.

In some embodiments, as shown in FIG. 8, the present disclosure provides a base station 80, comprising a memory 81, a processor 82, a communication interface 83, and a bus 84. The memory 81 is used for storing instructions, the processor 82 is coupled to the memory 81, and the processor 82 is configured to implement, based on the instructions stored in the memory 81, the above multi-antenna transmission coherence capability reporting method.

The memory 81 may be a high-speed RAM memory, a non-volatile memory, or the like, and the memory 81 may also be a memory array. The memory 81 may also be partitioned into blocks, and the blocks may be combined into virtual volumes according to certain rules. The processor 82 may be a central processing unit (CPU), or an application specific integrated circuit (ASIC), or one or more integrated circuits configured to implement the multi-antenna transmission coherence capability reporting method of the present disclosure.

In some embodiments, the present disclosure provides a computer-readable storage medium having thereon stored computer instructions which, when executed by a processor, implement the method according to any of the embodiments above.

It should be appreciated by those skilled in the art that, the embodiments of the present disclosure may be provided as a method, system, or computer program product. Accordingly, the present disclosure may take a form of an entire hardware embodiment, an entire software embodiment, or an embodiment combining software and hardware aspects. Moreover, the present disclosure may take a form of a computer program product implemented on one or more computer-usable non-transitory storage media (including, but not limited to, a disk memory, CD-ROM, optical memory, etc.) having computer-usable program code embodied therein.

The present disclosure is described with reference to flow diagrams and/or block diagrams of the method, device (system) and computer program product according to the embodiments of the present disclosure. It should be understood that each flow and/or block of the flow diagrams and/or block diagrams, and a combination of flows and/or blocks in the flow diagrams and/or block diagrams, can be implemented by computer program instructions. These computer program instructions may be provided to a processor of a general-purpose computer, special-purpose computer, embedded processor, or other programmable data processing devices to produce a machine, such that the instructions which are executed through the processor of the computer or other programmable data processing devices create means for implementing the functions specified in one or more flows of the flow diagrams and/or one or more blocks of the block diagrams.

These computer program instructions may also be stored in a computer-readable memory that can guide a computer or other programmable data processing devices to work in a specific manner, such that the instructions stored in the computer-readable memory produce an article of manufacture including instruction means which implement the functions specified in one or more flows of the flow diagrams and/or one or more blocks of the block diagrams.

In the multi-antenna transmission coherence capability reporting method, the terminal, the base station and the storage medium in the above embodiments, after the terminal establishes a connection with the base station, the multi-antenna coherence capability information is sent to the base station; the multi-antenna coherence capability information is used for indicating whether the terminal, in the uplink Tx switching mode, is capable of maintaining the coherence between multiple transmission antennas for the carrier with two uplink transmission antennas when the dynamic switching between two frequency bands is performed; the invention is applicable to various uplink Tx switching application scenarios, where requirements of higher uplink rate and/or lower latency are met, to ensure performance and stability of uplink transmission and improve use experience of a user.

The method and system of the present disclosure may be implemented in a number of ways. The method and system of the present disclosure may be implemented, for example, by software, hardware, firmware, or any combination of software, hardware, and firmware. The above order for the steps of the method is for illustration only, and the steps of the method of the present disclosure are not limited to the order specifically described above unless specifically stated otherwise. Furthermore, in some embodiments, the present disclosure may further be implemented as programs recorded in a recording medium, the programs including machine-readable instructions for implementing the method according to the present disclosure. Therefore, the present disclosure further covers a recording medium storing a program for performing the method according to the present disclosure.

The description of the present disclosure has been presented for purposes of examples and description, and is not intended to be exhaustive or limit this disclosure to the form disclosed. Many modifications and variations are apparent to one of ordinary skill in the art. The selection and description of the embodiments are to better explain the principles and the practical applications of the present disclosure, and to enable one of ordinary skill in the art to understand the present disclosure and therefore design various embodiments with various modifications suitable for a specific purpose.

What is claimed is:

1. A multi-antenna transmission coherence capability reporting method, comprising:
   sending, by a terminal, multi-antenna coherence capability information to a base station, after the terminal establishes a connection with the base station; wherein:
   the multi-antenna coherence capability information is used for indicating whether the terminal, in an uplink transmitter (Tx) switching mode, is capable of supporting coherence between multiple transmission antennas for a carrier with two uplink transmission antennas when dynamic switching between two frequency bands is performed;
   the multi-antenna coherence capability information comprises: at least one of non-coherent transmission capability information, partial-coherent transmission capability information, or full-coherent transmission capability information, wherein a granularity of the non-coherent transmission capability information, the partial-coherent transmission capability information, and the full-coherent transmission capability information is granularity of at least one of a band combination, a band, or the terminal; and
   a reporting granularity of the non-coherent transmission capability information, the partial-coherent transmission capability information, and the full-coherent transmission capability information is at least one granularity of each band combination supporting uplink Tx switching, each band with two uplink transmission antennas supporting the uplink Tx switching, each band with two uplink transmission antennas within a band combination supporting the uplink Tx switching, or the terminal supporting the uplink Tx switching.

2. The multi-antenna transmission coherence capability reporting method according to claim 1, further comprising:
   receiving, by the terminal, uplink scheduling information sent from the base station after sending the multi-antenna coherence capability information, to perform corresponding configuration based on the uplink scheduling information.

3. The multi-antenna transmission coherence capability reporting method according to claim 1, wherein the sending, by the terminal, multi-antenna coherence capability information to the base station comprises:
   by the terminal, generating a pusch-TransCoherence indication based on the multi-antenna coherence capability information, adding the pusch-TransCoherence indication into MIMO-ParametersPerBand capability information, and sending the MIMO-ParametersPerBand capability information to the base station.

4. The multi-antenna transmission coherence capability reporting method according to claim 1, wherein the sending, by the terminal, multi-antenna coherence capability information to the base station comprises:
   by the terminal, adding the multi-antenna coherence capability information in the uplink Tx switching mode into a coherence indication message, and sending the coherence indication message to the base station.

5. The multi-antenna transmission coherence capability reporting method according to claim 4, further comprising:
   extracting the pusch-TransCoherence indication in the received MIMO-ParametersPerBand capability information to obtain multi-antenna coherence information by the base station, under the condition that the base station does not receive the coherence indication message.

6. The multi-antenna transmission coherence capability reporting method according to claim 4, wherein the connection established by the terminal with the base station comprises a radio resource control (RRC) connection; and the sending, by the terminal, the coherence indication message to the base station comprises:
   sending, by the terminal, the coherence indication message to the base station through an physical uplink sharing channel time slot allocated by the base station, after establishing the RRC connection with the base station.

7. The multi-antenna transmission coherence capability reporting method according to claim 1, further comprising:
   by the terminal, receiving RRC signaling sent by the base station, and configuring the uplink Tx switching mode; wherein the RRC signaling comprises uplink Tx switching configuration signaling.

8. A terminal, comprising:
   a memory; and a processor coupled to the memory, the processor being configured to perform, based on instructions stored in the memory, the method according to claim 1.

9. A computer-readable storage medium having thereon stored computer instructions which, when executed by a processor, perform the method according to claim 1.

10. A multi-antenna transmission coherence capability reporting method, comprising:
    receiving, by a base station, multi-antenna coherence capability information sent by a terminal, after a connection between the base station and the terminal is established; wherein:
    the multi-antenna coherence capability information is used for indicating whether the terminal, in an uplink Tx switching mode, is capable of supporting coherence between multiple transmission antennas for a carrier with two uplink transmission antennas when dynamic switching between two frequency bands is performed;
    the multi-antenna coherence capability information comprises: at least one of non-coherent transmission capability information, partial-coherent transmission capability information, or full-coherent transmission capability information, wherein a granularity of the non-coherent transmission capability information, the partial-coherent transmission capability information, and the full-coherent transmission capability information is granularity of at least one of a band combination, a band, or the terminal; and
    a reporting granularity of the non-coherent transmission capability information, the partial-coherent transmission capability information, and the full-coherent transmission capability information is at least one granularity of each band combination supporting uplink Tx switching, each band with two uplink transmission antennas supporting the uplink Tx switching, each band with two uplink transmission antennas within a band combination supporting the uplink Tx switching, or the terminal supporting the uplink Tx switching.

11. The multi-antenna transmission coherence capability reporting method according to claim 10, further comprising:
sending, by the base station, uplink scheduling information to the terminal after receiving the multi-antenna coherence capability information, to make the terminal perform corresponding configuration based on the uplink scheduling information.

12. The multi-antenna transmission coherence capability reporting method according to claim 10, wherein the receiving, by the base station, multi-antenna coherence capability information sent by the terminal comprises:
by the base station, receiving MIMO-ParametersPerBand capability information sent by the terminal, extracting a pusch-TransCoherence indication in the MIMO-ParametersPerBand capability information, and determining the multi-antenna coherence capability information based on the pusch-TransCoherence indication.

13. The multi-antenna transmission coherence capability reporting method according to claim 10, wherein the receiving, by the base station, multi-antenna coherence capability information sent by the terminal comprises:
by the base station, receiving a coherence indication message sent by the terminal, and extracting the multi-antenna coherence capability information from the coherence indication message.

14. The multi-antenna transmission coherence capability reporting method according to claim 10, further comprising:
sending RRC signaling to the terminal by the base station, to make the terminal configure the uplink Tx switching mode after the terminal receives the RRC signaling, wherein the RRC signaling comprises: uplink Tx switching configuration signaling.

15. The multi-antenna transmission coherence capability reporting method according to claim 10, further comprising:
extracting, by the base station, the pusch-TransCoherence indication in the received MIMO-ParametersPerBand capability information to obtain multi-antenna coherence information, under the condition that the base station does not receive the coherence indication message.

16. A base station, comprising:
a memory; and a processor coupled to the memory, the processor being configured to perform, based on instructions stored in the memory, the method according to claim 10.

* * * * *